United States Patent
Bellamkonda et al.

(10) Patent No.: US 9,426,776 B2
(45) Date of Patent: Aug. 23, 2016

(54) METHOD AND APPARATUS FOR ENFORCING TIERED GEOGRAPHICAL ANONYMITY IN A MOBILE DEVICE

(71) Applicant: GOOGLE TECHNOLOGY HOLDINGS LLC, Mountain View, CA (US)

(72) Inventors: Krishna K. Bellamkonda, Lake Zurich, IL (US); Jlng Ji, Gurnee, IL (US); Brett L. Robertson, Mundelein, IL (US); Hideki Yoshino, Lake Zurich, IL (US); Hui Wang, Gurnee (IL)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/446,876

(22) Filed: Jul. 30, 2014

(65) Prior Publication Data

US 2016/0037480 A1  Feb. 4, 2016

(51) Int. Cl.
  *H04W 24/00*  (2009.01)
  *H04W 64/00*  (2009.01)
  *H04W 4/02*  (2009.01)
  *H04L 29/06*  (2006.01)

(52) U.S. Cl.
  CPC ............ *H04W 64/006* (2013.01); *H04L 63/04* (2013.01); *H04W 4/028* (2013.01); *H04W 4/025* (2013.01)

(58) Field of Classification Search
  CPC ...... G01C 21/201; G01C 21/00; G01C 21/26; G01C 21/20; H04W 24/08; H04W 4/02; H04W 4/021; H04W 4/023; H04W 64/00; H04W 64/003; H04W 64/006; H04W 72/044; H04W 72/0453; H04W 72/048; H04W 84/12; H04W 88/08; H04W 8/18; H04W 92/02; H04W 24/00; H04W 16/18; H04W 24/06; H04L 29/08657; H04L 12/2697; G01S 5/0252; G01S 5/02; H04M 1/72572; H04M 3/42229; H04Q 3/005; H04Q 3/0029
  USPC ........ 455/456.1, 456.2, 456, 456.3, 423, 457, 455/561
  See application file for complete search history.

(56) References Cited

U.S. PATENT DOCUMENTS 5,752,164 A * 5/1998 Jones ....................... H04B 1/38
                                                         379/29.01
7,302,343 B2  11/2007 Beatty
(Continued)

OTHER PUBLICATIONS

"International Search Report and Written Opinion", Application No. PCT/US2015/042859, Oct. 28, 2015, 9 pages.

*Primary Examiner* — Allahyar Kasraian
*Assistant Examiner* — B. M. M Hannan
(74) *Attorney, Agent, or Firm* — Wolfe-SBMC

(57) ABSTRACT

A disclosed method of operation includes generating a first resolution geographic descriptor that identifies a first size geographic grid area. The first size geographic grid area includes a specific location identified by mobile device location data but does not identify the specific location. The method proceeds with adjusting the first resolution geographic descriptor to a second resolution geographic descriptor, by increasing or decreasing the resolution to correspondingly decrease or increase, respectively, the corresponding geographic grid area to a second size geographic grid area that includes the specific location. An information update is then sent to a server. The information update includes the second resolution geographic descriptor but does not provide the mobile device location data, in order to preserve the mobile device user's anonymity.

20 Claims, 6 Drawing Sheets

(56) References Cited

U.S. PATENT DOCUMENTS

| | | | |
|---|---|---|---|
| 9,002,384 B1* | 4/2015 | Hallenbeck | 455/457 |
| 2004/0139049 A1* | 7/2004 | Hancock | G01C 21/20 |
| 2012/0309413 A1* | 12/2012 | Grosman | H04W 64/006 |
| | | | 455/456.1 |
| 2013/0053023 A1* | 2/2013 | Meredith | H04W 24/08 |
| | | | 455/423 |
| 2014/0059695 A1 | 2/2014 | Parecki et al. | |
| 2014/0199970 A1 | 7/2014 | Klotz | |
| 2014/0293955 A1* | 10/2014 | Keerthi | H04W 72/048 |
| | | | 370/330 |
| 2014/0342755 A1* | 11/2014 | Youssef | G01S 1/685 |
| | | | 455/456.2 |
| 2015/0181372 A1* | 6/2015 | Huang | H04W 4/02 |
| | | | 455/456.1 |
| 2015/0215731 A1* | 7/2015 | Chen | H04W 4/02 |
| | | | 455/456.3 |

* cited by examiner

METHOD AND APPARATUS FOR ENFORCING TIERED GEOGRAPHICAL ANONYMITY IN A MOBILE DEVICE

FIELD OF THE DISCLOSURE

The present disclosure relates generally to mobile device location data and more particularly to methods and apparatuses that collect or obtain location data from mobile devices.

BACKGROUND

The capability of mobile devices to obtain location data using an internal Global Positioning System (GPS) chipset or some other means has become ubiquitous and also required in order to facilitate E911 services. Also ubiquitous are various commercial mobile device applications that make use of mobile device location data in order to provide services. Along with the benefits associated with location based services, privacy concerns have arisen related to tracking of individual mobile device user locations.

Understandably, because of such privacy concerns, many mobile device users either decide not to use location based applications and services at all, or adjust privacy settings so that no location data is provided by the mobile device to any applications or external systems, rendering the applications useless. The nature of a mobile device as being "mobile" however, lends itself greatly to the potential for feature and service optimization based on location changes and corresponding changes in various conditions. The prevention of access to mobile device location data by external systems is therefore detrimental to achieving and delivering optimal mobile device performance and features.

DETAILED DESCRIPTION

Figure 1:
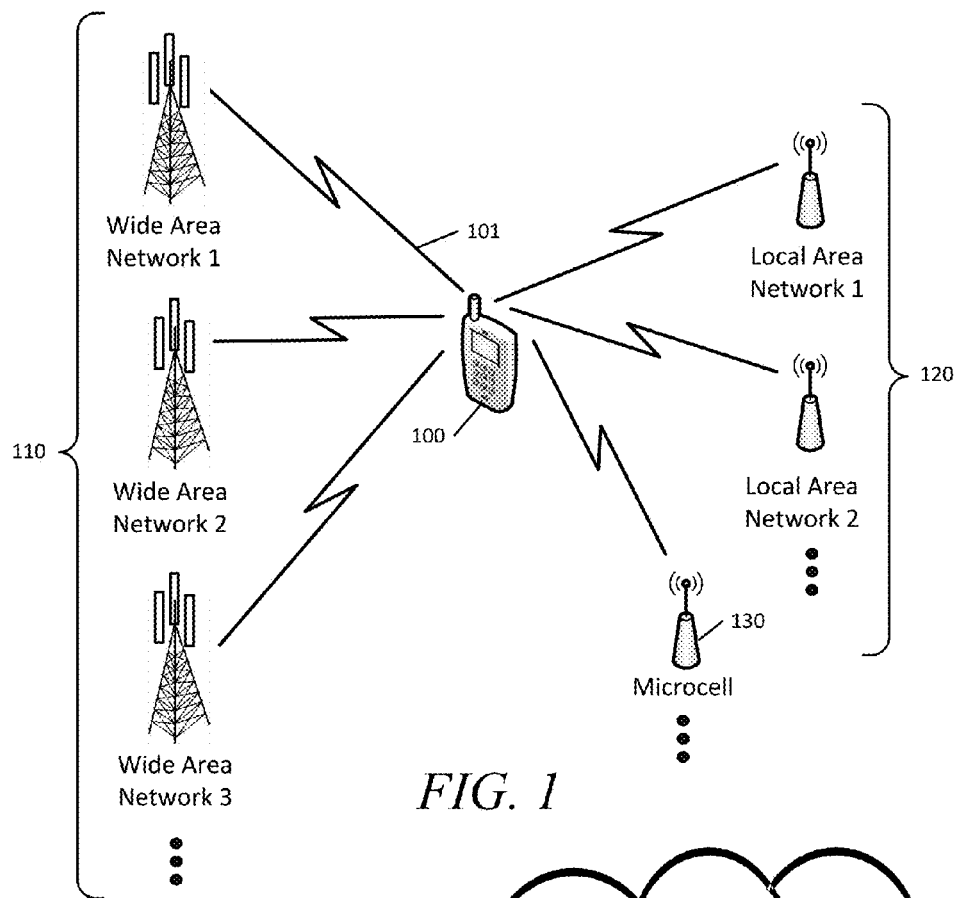
FIG. 1 is a diagram illustrating a mobile device taking measurements and collecting connectivity information from various wide area networks, local area networks, microcells and femtocells, in accordance with an embodiment.

Briefly, the disclosed embodiments determine various levels of location data abstraction in relation to population density of an area for the purpose of preserving mobile device user anonymity while collecting geotagged data. For example, in densely populated urban areas the level of abstraction required may correspond to a city block. On the other hand, in a lightly populated rural area an appropriate level of abstraction may be several square miles. The disclose embodiments also account for locations with transient population density such as office buildings or business areas and make use of time and day to decide appropriate abstraction levels. Therefore, a multi-level (or tiered) abstraction schema is obtained in the embodiments through use of appropriately determined geodescriptor resolutions. In an aspect of the embodiments, among other advantages, crowd-sourced geotagged network data is collected and aggregated for use in optimizing mobile device performance for data delivery. Individual mobile device user anonymity is preserved in the various embodiments by applying the disclosed tiered location data abstraction techniques.

Accordingly, one disclosed method of operation begins with generating a first resolution geographic descriptor that identifies a first size geographic grid area. The first size geographic grid area includes a specific location identified by mobile device location data but does not identify the specific location. The method proceeds with adjusting the first resolution geographic descriptor to a second resolution geographic descriptor, by increasing or decreasing the resolution to correspondingly decrease or increase, respectively, the corresponding geographic grid area to a second size geographic grid area that includes the specific location. An information update is then sent to a server. The information update includes the second resolution geographic descriptor but does not provide the mobile device location data, in order to preserve the mobile device user's anonymity.

The method may further include adjusting the first resolution geographic descriptor to the second resolution geographic descriptor to meet a minimum population density of mobile devices within the second size geographic grid area. In some embodiments, the population density may be determined using historical population data. The method may further include determining that the mobile device population density within the second size geographic grid area is time dependent. In that case, the method proceeds by adjusting the second resolution geographic descriptor to a third resolution geographic descriptor that identifies a third size geographic grid area. The third size geographic grid area includes the specific location but also meets a minimum population density of mobile devices within the third size geographic grid area. Further in some embodiments, the method may proceed by determining that a number of radio access points within the second size geographic grid area is below a minimum allowable number. In that case, the method proceeds by adjusting the second resolution geographic descriptor to a third resolution geographic descriptor that identifies a third size geographic grid area to meet the minimum allowable number of radio access points within the third size geographic grid area. The third size geographic grid area also includes the specific location.

In some embodiments, the method includes measuring, by a mobile device, at least one network performance metric, geotagging the performance metric using the second resolution geographic descriptor and sending the information update including the performance metric and the second resolution geographic descriptor. Also in some embodiments, the mobile device may receive a request from the server to adjust the geographic descriptor resolution. For example, the method may include receiving a request from the server to adjust the second resolution geographic descriptor to a third resolution geographic descriptor, by increasing the resolution to correspondingly decrease the corresponding geographic grid area to a third size geographic grid area based on a network exception report. The mobile device then proceeds to sending information updates with the performance metrics and the third resolution geographic descriptor. This enables the server to "zoom in" on problem areas within a given network to help identify potential sources of the exception. Measure network performance metrics may include at least one of a data quality metric or a voice quality metric. Information updates may include, among other things, a network ID, a cell ID, frequency and band information, or a detected radio access technology identification.

The present disclosure also provides an example mobile device that includes at least one wireless network transceiver, location detection logic, memory and at least one processor. The processor is operatively coupled to the memory, to the location detection logic, and to the at least one wireless network transceiver. The at least one processor is operative to, among other things, perform operations of the disclosed methods of operation.

Another disclosed method relates to operation of a server. The method begins with the server receiving information updates from a plurality of mobile devices. Each information update includes a first resolution geographic descriptor that identifies a first size geographic grid area. The first size geographic grid area includes a specific location identified by mobile device location data. However the server does not obtain the location any mobile device location data other than the first resolution geographic descriptor. The method proceeds with the server identifying a network exception occurrence within the first size geographic grid area based on the information updates. The server then sends a request message to mobile devices within the first size geographic grid area and requests adjustment of the first resolution geographic descriptor to a second resolution geographic descriptor, by increasing the resolution to correspondingly decrease the corresponding geographic grid area to a second size geographic grid area based on the network exception occurrence. The method then proceeds with the server receiving information updates from the mobile devices within the second size geographic grid area including the performance metric and the second resolution geographic descriptor. This enables the server to "zoom in" on locations having network exceptions to help identify the source of the problem. The server aggregates the information updates and generates a geotagged statistical data database for a plurality of heterogeneous wireless networks.

Turning now to the drawings, FIG. 1 illustrates a mobile device 100, various heterogeneous wide area networks 110 (each of which may include one or more microcells 130), various heterogeneous wireless local area networks 120 and various femtocells (not shown). Wide area networks may also be referred to as public land mobile networks (PLMNs). Each of these various heterogeneous networks is operatively coupled to the Internet via an appropriate backhaul connection and is operative to provide Internet access to one or more subscribed mobile devices. The mobile device 100 may be a subscriber to any one of the heterogeneous wide area networks 110, or may be a customer of an MVNO (mobile virtual network operator). An MVNO may provide the mobile device 100 with access to resources on one or more of the wide area networks 110. The mobile device 100 may also access one or more of the various wireless local area networks 120.

As the mobile device 100 changes location it exits and enters various radio frequency (RF) coverage areas of network transceivers and corresponding antennas. Therefore the mobile device 100 may at times be within or outside of the RF coverage area of any particular wide area network 110 or of any wireless local area network 120 such that it can or cannot establish a wireless link 101. More specifically, as the mobile device 100 moves through various geographic locations or regions it also moves through the RF coverage areas of the various networks. As the mobile device 100 moves through the various RF coverage areas, it takes measurements of network connectivity and various network performance metrics for networks with which it interacts with or can detect. Additionally, the mobile device 100 observes its own internal sensors and determines its state during times at which it establishes data connectivity, voice connectivity, or engages in other utilization that impacts battery charge time or other parameters of the mobile device 100. As the mobile device 100 collects information, it geo-tags the information with location information corresponding to the location at which the information was obtained (for example, where measurements were taken, etc.). The mobile device 100 also timestamps the information collected with a timestamp that includes time and date.

Figure 2:
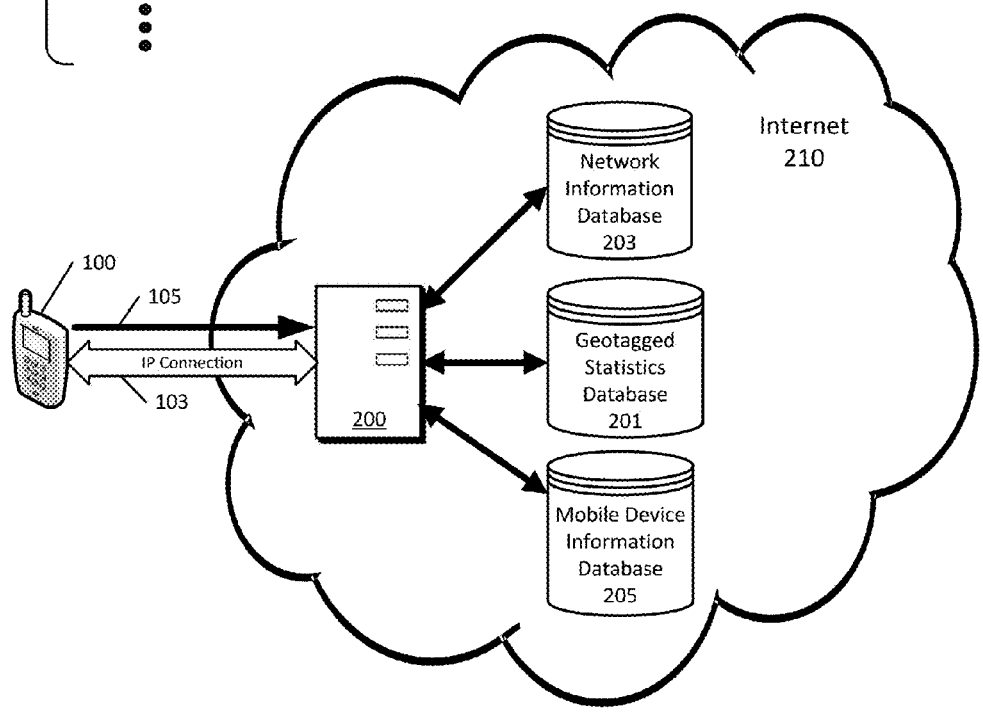
FIG. 2 is block diagram of mobile device communicating with a server that aggregates geotagged statistical data from various networks in accordance with an embodiment.

FIG. 2 illustrates that the mobile device 100 communicates with a server 200 in order to send information updates 105. The information updates 105 include the geo-tagged, time stamped network information (for example, measured and/or observed connectivity and performance metrics) and mobile device 100 state information. The mobile device 100 may establish an IP connection 103 through either its subscribed network, through one of its MVNO networks in the MVNO case, or through a wireless local area network 120. The mobile device 100 is only one of various mobile devices that send information updates 105 to the server 200. The server 200 maintains, or is integrated with, an aggregated geotagged statistics database 201, a network information database 203, and a mobile device information database 205. In one embodiment, the server 200 is a cloud-based server that resides in the Internet 210 along with the various databases. The databases may also be cloud based, and may be distributed among several physical locations. Mobile device information updates 105 that are received by the server 200 are aggregated into the geotagged statistics database 201 such that the specific mobile devices that provide the information updates 105 cannot be individually identified.

The aggregated geotagged statistics database 201 is used by the server 200 to create various mappings of network performance metrics to geographic locations and to infer network topographies for such regions including inferring specific network cell coverage in given regions for various heterogeneous networks. Using these mappings and inferred topographies, the server 200 is operative to suggest connectivity and/or other services to mobile devices in order to optimize data throughput, battery life, and other performance characteristics of the mobile devices. More particularly, by receiving information updates 105 from the mobile device 100 and from other mobile devices, the server 200 is operative to construct and maintain the geotagged statistics database 201 for the purpose of improving the connectivity and/or data throughput of mobile devices as the mobile devices move through various geographic locations having different levels of RF coverage and varying levels of service.

For example, each one of the various wide area networks 110 may employ different radio access technologies. Certain radio access technologies may be limited in terms of which services the technology can provide. Therefore, in some instances, only certain services can be provided to the mobile device 100 by certain wide area networks 110 depending on the radio access technologies employed. Likewise, the local area networks 120 may employ differing radio access technologies. The mobile device 100 may only be capable of accessing certain radio access technologies, or some radio access technologies may be preferable for certain services provided to the mobile device 100 such as data connectivity. For example, if the mobile device 100 is 4G capable, it may be preferable at certain times of the day to access a specific wide area network that can provide 4G data connectivity in order to meet a high data throughput demand that the mobile device 100 may have at certain times and/or on certain days. The server 200, which has knowledge of the mobile device 100 location, can provide appropriate connectivity information to the mobile device 100 such that it may establish optimized connections based on aggregated, crowd-sourced mobile device performance history for mobile devices of a similar type to mobile device 100. The server 200 also provides connectivity information based on aggregated, crowed-sourced data related to the performance of various networks measured in various geographic locations, at various times, and under various conditions as recorded in the network information database 203.

Therefore, the server 200 collects crowd sourced data on the various wide area networks 110, including any microcells 130, wireless local area networks 120, and femtocells (not shown). This crowd sourced data is aggregated by the server 200 and mapped to geographic descriptors. This information is stored and maintained in the geotagged statistics database 201. The server 200 therefore has the capability of optimizing connectivity and services of any mobile device that sends information updates 105 and that may also receive connectivity information in return from the server 200.

Figure 3:
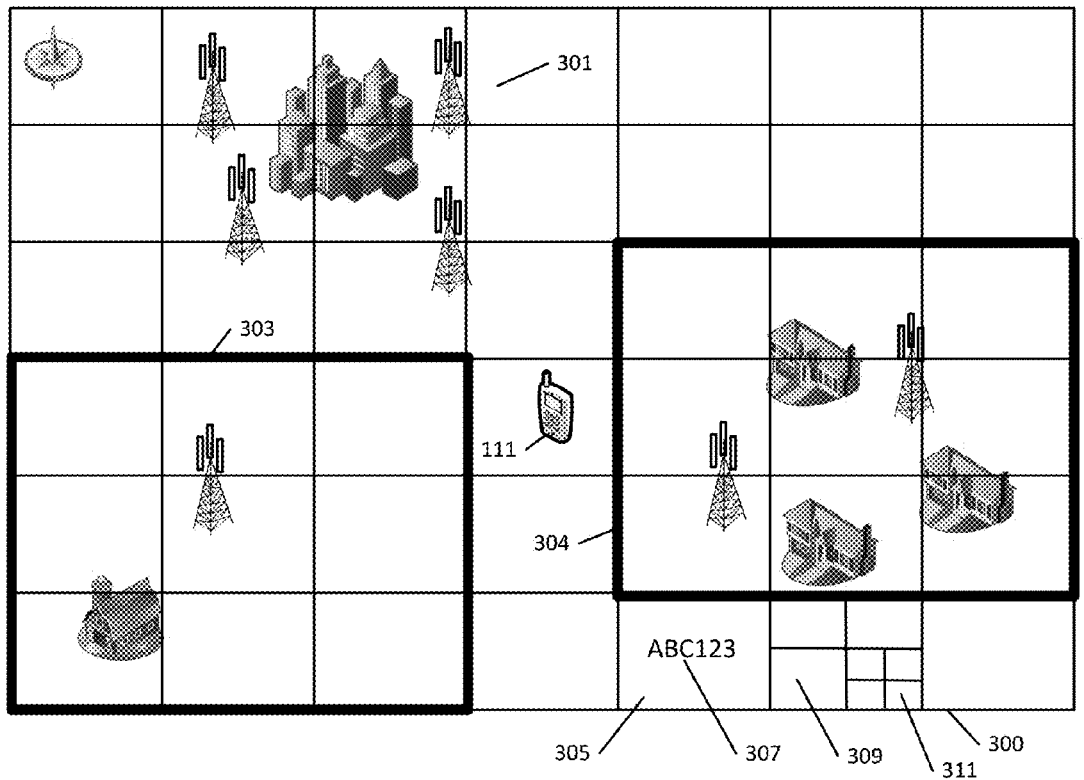
FIG. 3 is a diagram of geographic regions divided up into a grid defined by geographic descriptors ("geodescriptors") in accordance with the embodiments.

FIG. 3 provides an example of how a geographic region can be partitioned into a grid using geographic descriptors. The geographic region is defined by a geographic grid area 300 that includes an urban area 301 having a large number of wireless networks, a suburban grid area 304 that has a lesser number of wireless networks, and a rural area 303 (such as farmland) that has a limited number of wireless networks. As a mobile device 111 moves through the geographic regions, the mobile device 111 may be individually identifiable based on its connectivity to certain wireless networks. More specifically, the mobile device 111 may be identifiable because each RF coverage area may be associated with a specific geographic location and will only have a finite number of users connected at a given time. As well understood by those of ordinary skill, network operators maintain call detail records (CDR) which contain metadata such as, but not limited to, phone numbers of the calling party and the called party, call type, etc. Those of ordinary skill will understand that CDR information could be associated with transmitted location data and could be used to identify a mobile device user by some third party who obtained the data. For example, if the mobile device 111 moves into the rural area 303, the mobile device 111 may receive service from a single wireless network and from a specific base transceiver station. Furthermore, if the mobile device 111 sends data geo-tagged with location coordinates including latitude and longitude to a service provider or an application provider, it may be possible to use the location data to individually identify the mobile device 111 and therefore also identify the mobile device user as being at that location. This creates a privacy concern for the mobile device user which the presently disclosed embodiments are designed to alleviate among other advantages.

By using geographic descriptors having an enforced resolution in the various embodiments, rather than using specific location coordinates including latitude and longitude, a level of abstraction is enforced for geographic location information used by the mobile device 111 to geo-tag information updates 105 sent to the server 200. By appropriately enforcing levels of abstraction upon the geographic location information, the possibility for identification of the specific mobile device 111 is reduced thereby enhancing the privacy of the mobile device user. Put another way, geographic location data is sent using the lowest useful resolution in order to preserve mobile device user anonymity.

In other embodiments, the server 200 may request that mobile devices increase the resolution of geographic descriptors used to geotag network performance metrics so that the server can "zoom in" on geographic locations generating network exceptions. More specifically, the data collected by the server 200 may indicate a network exception (i.e. a network performance problem such as, but not limited to, dropped calls, poor data or voice connectivity, poor data throughput, network congestion or other problems, etc.) occurrence in some given geographic area based on the geographic descriptors used to geotag the collected network performance metrics sent by the mobile devices. The server may request the mobile devices in the problem area to increase resolution in order to attempt to narrow down the source of the network exception and perform troubleshooting on the network.

An example geographic descriptor 307 is a single string of binary digits that correspond to a grid area such as example grid area 305. The resolution of the geographic descriptor 307, and therefore the size of its corresponding specified grid area, may be adjusted by adding additional binary digits or by omitting binary digits. That is, the size of the corresponding specified grid area is reduced by adding binary digits, and is increased by omitting binary digits. One example of such a geographic descriptor that may be used in the various embodiments is a "Geohash" geographic descriptor. The Geohash encoding generates a latitude/longitude geocode using a base 32 mapping in which each base 32 character is represented by five binary digits. The resolution of the base 32 geocode is adjusted by adding or removing base 32 characters from the geocode string. Put another way, adding base 32 characters enhances the resolution of the geographic descriptor, while removing base 32 characters decreases the resolution of the geographic descriptor thereby increasing the size of the corresponding grid area. For example, the grid area 305 may correspond to a geographic descriptor 307 having the six, base-n characters of "ABC123." In an example using Geohash, the character string would be constructed using base 32 characters. Therefore, the grid area 305 is represented by a first resolution geographic descriptor "ABC123" in the example of FIG. 3. A second resolution grid area 309 may be represented by a second resolution geographic descriptor "ABC1234" (i.e. adding a base 32 character) such that the resolution is increased and the second resolution grid area 309 is smaller than the grid area 305. Continuing the example, a third resolution grid area 311 may be represented by a third resolution geographic descriptor "ABC12345" where the third resolution grid area 311 is even smaller. Therefore, the resolution of the geographic descriptors may be adjusted by increasing or decreasing the geographic descriptor resolution which correspondingly decreases or increases the size of the identified grid area.

The mobile device 111 takes measurements of network performance metrics as it moves about the grid area 300. As the mobile device 111 obtains location data, which identifies a specific location at which the mobile device 111 is located, it generates a geographic descriptor that corresponds to a geographic grid area. The geographic grid area will include the specific location identified by the mobile device 111 location data (such as GPS data) however the mobile device 111 will not send out any location data and therefore does not identify its specific location. Instead it geotags information using the generated geographic descriptor which identifies a corresponding geographic grid area. The corresponding geographic grid area includes the mobile device 111 specific location but does not explicitly identify or pinpoint the specific location. Further rules are applied regarding the geographic descriptor resolution which maximizes the usefulness of the collected location data and network performance data, while anonymizing the mobile device (i.e. protecting its specific location) based on the applied rules.

Figure 4:
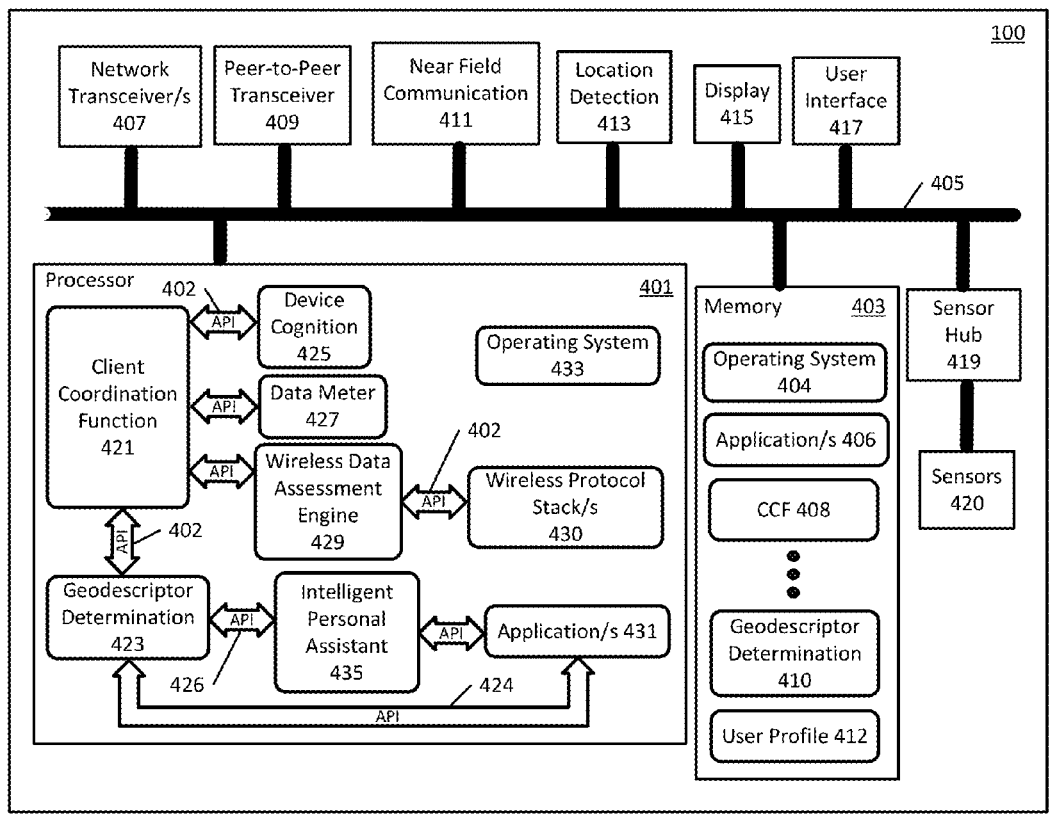
FIG. 4 is block diagram of a mobile device operative to collect network connectivity information and mobile device operation data and to geotag the data in accordance with an embodiment.

FIG. 4 provides example details of the mobile device 100 which is one example apparatus in accordance with the embodiments. In FIG. 4, the example mobile device 100 includes at least one internal communication bus 405 which provides operative coupling between the various components. Each of the various components of the mobile device 100 that are operatively coupled to the communication bus 405 may accordingly send information to, or receive information from, a processor 401. In addition to at least one processor 401, the mobile device 100 components include, but are not limited to, one or more network transceivers 407, a peer-to-peer transceiver 409, near field communication logic 411, location detection logic 413 (such as, but not limited to, a GPS receiver), a display 415, a user interface 417, memory 403, a sensor hub 419, one or more microphones (not shown) and a speaker (not shown). The sensor hub 419 is operatively coupled to a plurality of sensors 420 which may include thermal sensors, proximity sensors, accelerometers, gyroscopic sensors, light sensors, etc.

The processor 401 is operative to execute executable instructions (also referred to as "executable code" or "code") including operating system executable code 404 to run at least one operating system 433, wireless protocol stack code (not shown) to run one or more wireless protocol stacks 430, and application (or "user space") executable code 406 to run one or more applications 431. In accordance with the embodiments, the processor 401 is also operative to execute client coordination function (CCF) code 408 to run a CCF 421 and geodescriptor determination code 410 to run a geodescriptor determination logic 423

The CCF 421 may interact and communicate with the geodescriptor determination logic 423 via one or more APIs of a suite of APIs 402 (application programming interfaces) or via other appropriate operative coupling. The CCF 421 may also interact and communicate with a device cognition logic 425, a data meter 427 and a wireless data assessment engine 429 via one or more APIs of the API suite 402. The device cognition logic 425, data meter 427 and wireless data assessment engine 429 also have corresponding executable code stored in memory 403 for execution by the processor 401. The executable code for these components may be integrated with the CCF code 408.

The geodescriptor determination logic 423 may communicate with an intelligent personal assistant ("IPA") 435 by an API 426 and with one or more of the applications 431, via API suite 424. These APIs allow submission of a geodescriptor to the IPA 435 or to location based applications of applications 431, such that the user may obtain benefits of providing location information while still maintaining a level of anonymity.

The device cognition logic 425 is operative to communicate with the sensor hub 419 to obtain data from the plurality of sensors 420. This data may include information about the position of the mobile device 100, such as whether the mobile device 100 is stationary, in a docking station, placed flatly on a table surface, etc. and other information related to the ambient environment surrounding the mobile device 100. The location detection logic 413 may also be accessed by the device cognition logic 425, and by the geodescriptor determination logic 423, to obtain location information for the mobile device 100. The CCF 421 may manage the collection of data by the device cognition logic 425 and may determine time intervals or locations at which the device cognition logic 425 is to obtain data from the sensor hub 419 and the location detection logic 413.

The geodescriptor determination logic 423 implements a hash algorithm that maps latitude and longitude coordinates obtained from the location detection logic 413 to a single string of bits. This string of bits is subsequently used to geotag measurement data collected by the CCF 421, prior to sending the measurement data to the server 200 as information update 105. The data meter 427 is operative to monitor the one or more network transceivers 407, the peer-to-peer transceiver 409, or both, by way of one or more wireless protocol stacks 430 to determine the data throughput or data rate being achieved for the mobile device 100 at a particular point in time and at specific locations. The wireless data assessment engine 429 may also assess characteristics of a wireless channel formed by the one or more network transceivers 407 and report those characteristics to the CCF 421. These assessed characteristics may be related to voice channels, data channels or both. More particularly, the wireless data assessment engine 429 is operative to predict poor or sub optimal radio coverage at specific locations either by monitoring internal functions of the mobile device 100, such as those obtained by the sensor hub 419 or by monitoring inputs that may be received from the server 200 as will be discussed in further detail below. The CCF 421 collects the above described data from the device cognition logic 425, the data meter 427, and the wireless data assessment engine 429 and stores it in a user profile 412. The user profile 412 is stored in memory 403.

The data contained in the user profile 412 is time stamped and geotagged using a geographic descriptor determined by the geodescriptor determination logic 423 and the data is then subsequently sent to the server 200. A portion of the data contained in the user profile 412 is mobile device 100 operations data which is stored in the mobile device information database 205. Another portion is network connectivity and/or performance information which is stored in the network information database 203.

The CCF 421 obtains location data from the location detection logic 413 and "geo-tags" the data stored in the user profile 439 using a geodescriptor determined by the geodescriptor determination logic 423. In some embodiments, the geodescriptor determination logic 423 obtains the location data directly from the location detection logic 413 and the CCF 421 only receives the geographic descriptor.

Some of the collected data may also be geotagged by the other components that obtain the data initially such as the device cognition logic 425, data meter 427 or wireless data assessment engine 429. In such embodiments, the components communicate with the geodescriptor determination logic 423 to obtain a geodescriptor for geotagging.

This geotagging enables the data collection and aggregation logic 503 to associate the information updates, including any available mobile operations data, with geographic areas, and to compute statistics for those specific geographic areas. These statistics are aggregated, mapped to the geodescriptors and stored in the geotagged, statistics database 201. The data collection and aggregation logic 503 may use the geotag location information to determine network statistics for geographic areas at varying levels of granularity.

Continuing to refer to FIG. 4, the IPA 435 may predict where the mobile device 100 may be at a future point in time by, among other things, observing the mobile device 100 user's calendar and travel schedule, location information along often traveled routes, etc. This information may be aggregated and used by the IPA 435 to form predictions which may then be provided to the CCF 421. The mobile device 100 may include user settings that permit the IPA 435 to send this information, or that block the IPA 435 from sending some or any information. The CCF 421 therefore may receive predictions from the IPA 435 along with other information from the device cognition logic 425, the data meter 427 and the wireless data assessment engine 429, and may use this information to make decisions regarding connections formed by the mobile device 100. More specifically, the CCF 421 may use predictions from the IPA 435 to determine when to request connectivity information from the server 200 based on geographic location.

In one example, the CCF 421 may receive a prediction or indication from the IPA 435 that the mobile device 100 will be in the suburban grid area 304 at a specified time and in the urban area 301 at a different specified time. The CCF 421 may also determine that the mobile device 100 usually has a greater need for data while in the urban area 301. In response to these determinations, the CCF 421 may establish data connections with specific networks having a desired data throughput when the mobile device 100 is in the urban area 301. Alternatively, the CCF 421 may determine that some of the required data needed when the mobile device 100 is in the urban area 301, may be obtained prior to that time, at a lower "cost," while the mobile device 100 is in the suburban grid area 304. The "cost" may include, but is not limited to, considerations such as monetary cost, battery life, download time, specific applications running that require the data, user experience, etc. The CCF 421 may also send requests to the server 200 for crowd-sourced statistics and recommendations rather than making direct decisions.

In an alternative embodiment, the CCF 421 may send the information update 105 to the server 200 along with an optimization request. The server 200 may then perform heuristics to determine the best connectivity alternatives for the mobile device 100 and pass this information on to the CCF 421 so that the mobile device 100 may take appropriate actions (such as, for example, establishing data or voice connectivity with specific networks based on the information obtained from the server 200). The information provided by the server 200 will be applicable based on a geographic descriptor corresponding to the current or expected location of the mobile device. For example, if the IPA 435 predicted that the mobile device would be in urban area 301, then the mobile device CCF 421 will send an appropriate geographic descriptor to the server 200. The server 200 will send the mobile device recommendations for the urban area 301, or for some smaller portion of the urban area 301, that corresponds to the geographic descriptor.

Additionally, in some embodiments, the CCF 221 may request and receive destination and route prediction information from the IPA 435 and store it in the user profile 412. The destination and route prediction information, described using geodescriptors, may then be sent to the server 200 along with geotagged roaming connectivity information 115 and mobile operations data. The information stored in the user profile 412 may be restricted by user settings and these settings may also be stored in the user profile. For example, the user may restrict the CCF 221 use of prediction information and therefore this information may not be sent, or may not be used, by the server 200 in that case.

The CCF 421 may collect and send information updates 105 that may include, among other things, PLMN identification information, PLMN cell identification information, frequency band information and information regarding the overall quality obtained by the mobile device reporting on the respective connectivity. The quality information may include various quality indicators based on known quality metrics used for assessing wireless network connectivity and may be voice quality metrics, data connectivity metrics, etc., or combinations thereof.

Figure 5:
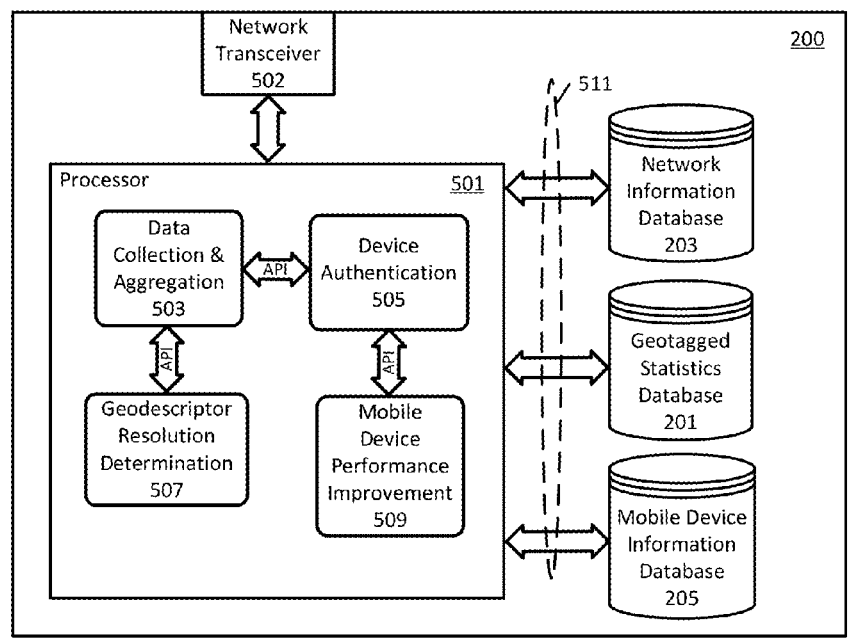
FIG. 5 is a block diagram of a server and various databases in accordance with an embodiment.

In accordance with the embodiments, the mobile device 100 may send either occasional or periodic information updates 105 over its respective subscribed wide area network, over a visited wide area network, or over a wireless location area network, etc., to the server 200. These information updates 105 provide information related to the current service being provided by the mobile device's respective serving network at specific points in time and at specific geographic locations. Occasional updates may be sent by mobile devices in response to the occurrence of specific, predetermined triggering conditions. For example, occasional updates may be triggered in some embodiments by changes in radio frequency (RF) coverage as determined by some RF coverage metric (for example, signal strength, signal-to-noise ratio, signal quality, etc.), change of location, or some other criteria or combinations thereof. In other embodiments, the updates may be periodic and may occur at predetermined time intervals. Such periodic updates may also begin in response to one or more trigger conditions such as, for example, when a mobile device travels out of RF coverage range of its respective home wide area network. Periodic updates are sent according to a schedule of the predetermined time intervals which may be defined by the server 200 and communicated to the mobile devices. In other words, occasional updates may only be sent in response to a trigger condition such as when a mobile device camps on a cell of a visited network or otherwise engages the visited network for services. Such an occasional update may therefore be considered a "one shot" operation in that a mobile device will send an information update 105 only in response to predetermined triggers. On the other hand, although periodic updates may also begin in response to predetermined triggers, periodic updates continue to be sent based on the schedule until the mobile device connectivity changes such as when the mobile device returns to its home wide area network. Each mobile device participating in information crowd-sourcing includes a CCF that determines when the mobile device will obtain data and when the mobile device will send that data to the server 200. The mobile device may obtain the data from the mobile device internal components (such as from sensors) or from its serving network or from both. As discussed above, data obtained from the mobile device itself may be stored in the mobile device information database 205 while the data obtained from the networks is stored in the network information database 203. FIG. 5 provides further details of one example of the server 200.

Turning to FIG. 5, the server 200 includes at least one processor 501 that is operatively coupled to a network transceiver 502 which enables the server 200 to communicate with the mobile device 100 via the IP connection 103 using the various wide area networks 110, microcells 130 and wireless local area networks 120 over the respective network backhaul connections. As discussed previously above, the server 200 and the data collection and aggregation logic 503 also maintain the network information database 203, mobile device information database 205 and the geotagged statistics database 201, any of which may or may not be integrated with the server 200. That is, the various databases may be stored on cloud servers remote from the server 200 but that are accessible to the server 200 via network connectivity. In some embodiments, one or more of the databases may also be distributed databases that are distributed among multiple cloud servers. In any of these embodiments, the processor 501 is operatively coupled to the databases using any of various appropriate database interface protocols 511 and network connectivity as needed in embodiments having remotely located or distributed databases.

The processor 501 is operative to execute the data collection and aggregation logic 503, a geodescriptor resolution determination logic 507, mobile device performance improvement logic 509 and a device authentication function 505. In some embodiments, the device authentication function 505 may reside on a different server that is operatively coupled to the server 200. The data collection and aggregation logic 503, among other things, handles receipt of the data collected by the various mobile devices such as mobile device 100 and may also run heuristics and/or statistics algorithms on the geo-tagged information updates 105 data to maintain the geotagged statistics database 201. The mobile device performance improvement logic 509 accesses the geotagged statistics database 201 to generate suggested connectivity solutions that may be sent to the various mobile devices as recommendations to improve performance and service levels based on abstracted geodescriptors received from the mobile devices. The geodescriptor resolution determination logic 507 may assist with data aggregation and mapping to geodescriptors by running algorithms to resolve geodescriptor aggregation issues for neighboring grid squares, or surrounding grid squares, when the geodescriptors generated for those surrounding grid squares have unlike prefixes, such as may occur when using the Geohash algorithm.

The data collection and aggregation logic 503 may determine scheduling of how and when the data is sent by the mobile devices 100 to the server 200 and may provide each of the participating mobile devices with scheduling information. Also as discussed previously above, the CCF 421 may also collect mobile device operations data that is specific to the mobile device 100. This mobile device operation data may be stored in the user profile 412 and also sent to the data collection and aggregation logic 503 as a part of the information update 105. The mobile device specific data however is geotagged using a geodescriptor that defines a geographic grid area rather than identifying a specific location. The geodescriptor may be stored in the mobile device information database 205 and used by the data collection and aggregation logic 503 to generate aggregated data in the geotagged statistics database 201. Depending on user settings, which may be stored in the user profile 412, the mobile device performance improvement logic 509 may provide more personalized performance improvements to the mobile device 100 by suggesting refined resolution geodescriptors from the mobile device. These refined resolution geodescriptors may be determined by the geodescriptor resolution determination logic 507, and sent to the mobile device. Otherwise, connectivity suggestions are made using the highest level abstraction geodescriptors that preserve anonymity of the mobile device 100 and the mobile device 100 user.

The resolution of geodescriptors may be modified by requests sent to the mobile device under some circumstances. The server 200 provides features for analyzing network performance and performing network traffic modeling, independently from the network infrastructure by using crowd-sourced data obtained from participating mobile devices. For purposes of network performance analysis, the network information database 203 includes "exception reports" that relate to network problems such as dropped calls, connectivity issues, data outages, congestion or other problems. When such problems are detected by the server 200, the geodescriptor resolution determination logic 507 may determine a new geodescriptor resolution at which to collect data in order to "zoom in" on a network location experiencing issues for troubleshooting purposes. Under these circumstances, the data collection and aggregation logic 503 will send a request to mobile devices that are nearby the location having the issues. The participating mobile devices will send data if their respective privacy settings allow for the requested resolution. For example, if the geographic resolution requested is too high given the population density of participating mobile devices in the location, the mobile device may deny or ignore the request.

Different geodescriptor resolutions may also be requested from the mobile devices in order to determine traffic models by identifying mobile device traffic transients and trends at certain locations. The server 200 may either request that the participating mobile devices either increase or decrease their geodescriptor resolutions for this purpose. For example, the server 200 may request higher resolution geodescriptors during busy hours when the population density of participating mobile devices is large.

Each one of the mobile devices, such as mobile device 100, that participate in crowd-sourcing network data by sending information updates 105, are subscribed to a service provided by the server 200 in accordance with the embodiments. Upon accessing and subscribing to the service provided by the server 200 each of the mobile devices receives the CCF 421 by a download or by a push operation and the CCF executable code 408 is stored in memory 403 of each mobile device. In mobile device 100, for example, the CCF executable code 408 provides executable instructions that are executable by the processor 401 to execute and run the CCF 421 in accordance with the embodiments. The execution of the CCF executable code 408 by the processor 401 may also implement and run the device cognition logic 425, data meter 427 and wireless data assessment engine 429. Also in accordance with the embodiments, the user profile 412 stored in the memory 403 of the mobile device 100 may be dynamically updated from time-to-time by the mobile device performance improvement logic 509 of the server 200 in conjunction with the CCF 421. In other words, as the mobile device 100 moves from geographic location to geographic location as defined by geodescriptors, the user profile 412 may be updated with helpful connectivity schedules and information that helps the mobile device 100 optimize data throughput performance (including using proactive data caching) and increase battery charge time.

The network information database 203 contains connectivity information and network performance metrics related to all of the heterogeneous wide area networks 110 and wireless local area networks 120 in accordance with information obtained and collected from the mobile devices participating in the data crowd-sourcing. The information may include, but is not limited to, network statistics for coverage and data connectivity, network IDs, cell IDs, frequency and band information, data and voice quality metrics, access technology employed, etc. Because this information is geotagged, the network information database 203 can be used by the data collection and aggregation logic 503, to discern a network topography for any of the networks for which information is observed, measured and collected. The network topographies and performance characteristics are obtained using "crowd-sourced" data in that data is collected from various mobile devices independently from the networks themselves and without any particular network involvement. In other words, the server 200 and data collection and aggregation logic 503 are not part of any network infrastructure but are independent from any specific network. As was discussed above, various mobile devices, such as example mobile device 100, occasionally or periodically send information updates 105 to the server 200 related to network connectivity and service level obtained from either a subscribed-to wide area network, from any visited wide area networks (i.e. "roaming networks") or from wireless local area networks. That is, each of the participating mobile devices includes a CCF and other associated components shown in the example of FIG. 4, such that each mobile device's CCF manages the collection of such data in cooperation with the data collection and aggregation logic 503 of the server 200.

Figure 6:
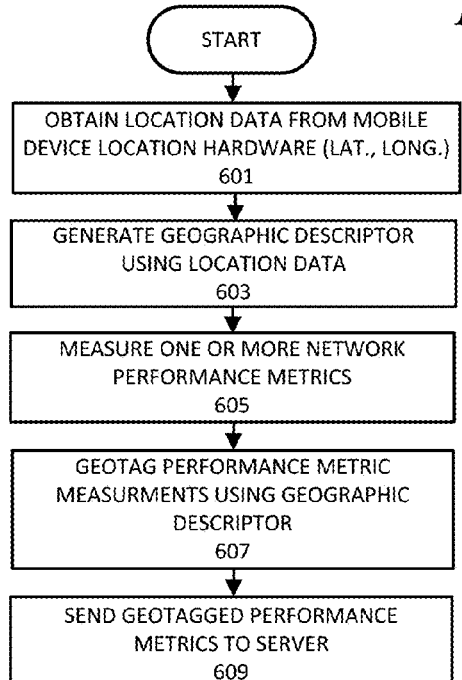
FIG. 6 is a flowchart of a method of operation of a mobile device for collecting and geotagging measurement data in accordance with an embodiment.

The flowchart of FIG. 6 provides an example high level operating process of the mobile device 100 and its interaction with the server 200. The method of operation begins, and in operation block 601, the CCF 421 obtains location data from the location detection logic 413 as latitude and longitude coordinates. The obtained location data is pushed to the geodescriptor determination logic 423 using the API suite 402. In operation block 603, the geodescriptor determination logic 423 generates geographic descriptor using the location data. In operation block 605, the CCF 421 measures network performance metrics for one or more networks. In operation block 607, the CCF 421 obtains the geographic descriptor from the geodescriptor determination logic 423 and uses it to geotag the data. The data is also time stamped. In operation block 609, the CCF 421 sends the geotagged data in an information update 105 sent to the data collection and aggregation logic 503 of server 200 and the method of operation then ends.

Figure 7:
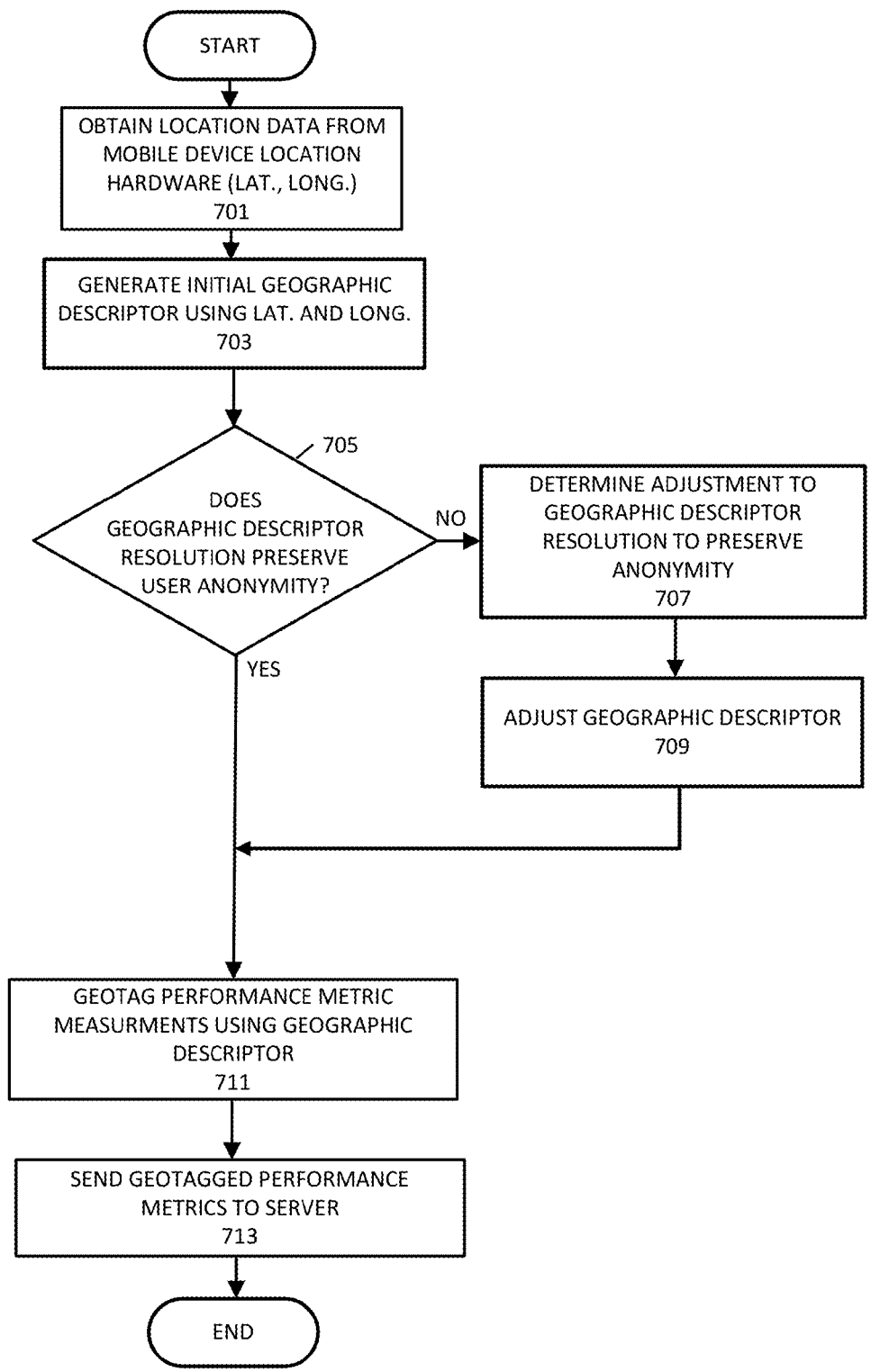
FIG. 7 is a flowchart of a mobile device method of operation for collecting network measurements, determining an appropriate geographic descriptor to preserve user anonymity, geotagging the measurements using the geographic descriptor, and sending the geotagged measurements to a server in accordance with an embodiment.

The flowchart of FIG. 7 provides a method of operation of a mobile device for collecting network measurements, determining an appropriate geographic descriptor to preserve user anonymity, geotagging the measurements using the geographic descriptor, and sending the geotagged measurements to a server in accordance with an embodiment. The method of operation begins and in operation block 701 the CCF 421 obtains location data from the location detection logic 413 as latitude and longitude coordinates. The obtained location data is pushed to the geodescriptor determination logic 423 using the API suite 402 and, in operation block 703, the geodescriptor determination logic 423 generates an initial geographic descriptor using the location data.

In decision block 705, the geodescriptor determination logic 423 checks whether the initial geographic descriptor resolution is sufficient to preserve the mobile device 100 user's anonymity. This check initially involves checking the population density corresponding to the grid block size defined by the initially generated geodescriptor. This check may be performed by the geodescriptor resolution determination logic 507 of the server 200. The CCF 421 or the geodescriptor determination logic 423 on the mobile device 100 may send a request to the server 200 for the population density. If the population density is less than a threshold (for example, one-hundred people per grid block size or less), then the method of operation proceeds to operation block 707.

In operation block 707, an adjustment is made to lower the geodescriptor resolution, and therefore increase the grid block size, to further abstract the location data and preserve anonymity. The geodescriptor determination logic 423 adjusts the geodescriptor in operation block 709, and the method proceeds to operation block 711. If the geodescriptor resolution corresponded to a grid block size having a population density that met the threshold in decision block 705, then the method of operation likewise proceeds to operation block 711. In operation block 711, the information update, such as network performance metric measurements, is geotagged using the geodescriptor, and the geotagged data is sent to the server in operation block 713. The method of operation then ends.

Figure 8:
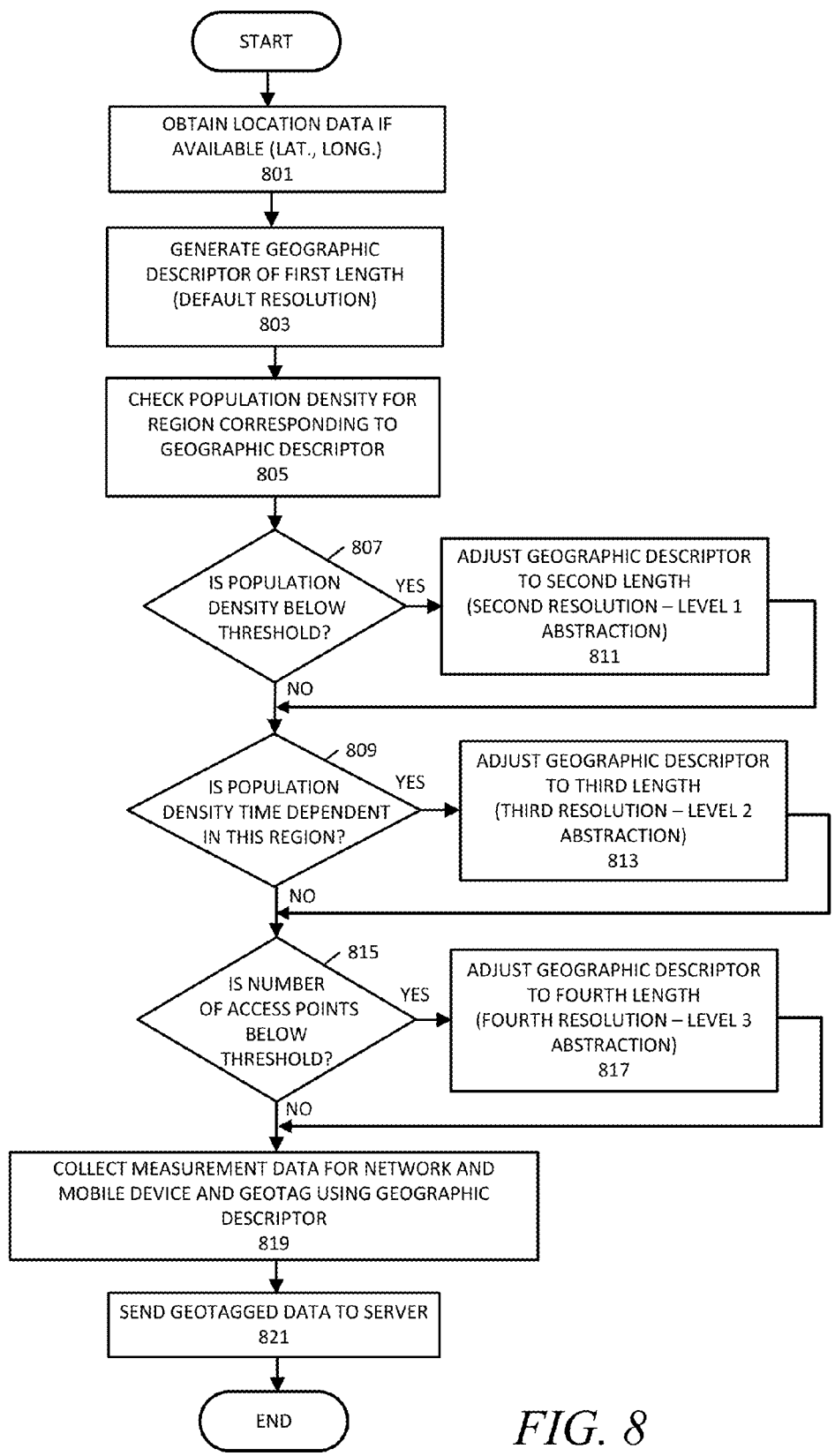
FIG. 8 is a flowchart of a method of operation of a mobile device in communication with a server in accordance with an embodiment.

The flowchart of FIG. 8 provides further details of methods of operation in accordance with the embodiments. The method of operation shown in FIG. 8 provides a tiered abstraction level for the geographic location data which is appropriate for optimizing mobile device performance in the related environment while preserving user anonymity. The term "abstraction" as used herein refers to the correlation of a geographic grid block of a given resolution to one or more network performance metrics. Specifically, crowd-source network performance metrics are geotagged and aggregated to develop network statistics. These network statistics may be used, along with predicted or determined mobile device operating schedules and connections, to enhance mobile device data throughput, connection availability (for data or voice) and increase mobile device battery charge time by reducing power consumption for high current drain activities (such as downloading large amounts of data). More specifically, the network statistics may be used to provide recommendations to a mobile device for improving data connectivity and throughput and reducing battery power consumption.

Therefore, in FIG. 8, the method of operation begins and in operation block 801 the CCF 421 obtains location data from the location detection logic 413 as latitude and longitude coordinates. In operation block 803, the geodescriptor determination logic 423 generates an initial geographic descriptor of a first length using the location data. The first length refers to the geocode length and is related to the grid block size and therefore determines the initial resolution as was discussed above. In operation block 805, the geodescriptor determination logic 423 checks the population density corresponding to the grid block size defined by the initially generated geodescriptor. In decision block 807, if the population density corresponding to the grid block size is below the acceptable threshold, then the method of operation proceeds to operation block 811. In operation block 811, the CCF 421, or the geodescriptor determination logic 423, implements a closed loop operation with the server 200 and with the geodescriptor resolution determination logic 507. In operation block 811, using the closed loop adjustment operation, the geodescriptor is correspondingly adjusted to a second length (i.e. geocode length) in order to provide a second resolution that provides the necessary abstraction to preserve the user's anonymity. The method of operation then proceeds to decision block 809. Likewise, if the population density was not below the acceptable threshold in decision block 807, the method of operation also proceeds to decision block 809.

In decision block 809, the geodescriptor determination logic 423 checks whether the population density in the grid block size corresponding to the geographic descriptor is time dependent. For example, in a city downtown area the population may be transient due to people coming and going from their respective workplaces. Therefore, an actual population density for a grid block size corresponding to such an area may not provide the entire picture. That is, the geodescriptor corresponding to that grid block size may not appropriately preserve the user's anonymity depending on the time of day or day of week if less people, who are mobile device users, are present. The check of decision block 809 is performed in a closed loop operation with the server 200. The geodescriptor resolution determination logic 507 of the server 200 may check, for example, the geo-tagged statistics database 201 to determine the number of mobile devices that are reporting data in the geographic location corresponding to the geodescriptor under scrutiny. The number of mobile devices reporting information may be used to infer the transient population corresponding to the grid block size. The geographic descriptor may then be adjusted accordingly, if needed, to a third length corresponding to a third resolution and a second level of abstraction as shown in operation block 813. The method of operation then proceeds to decision block 815. If the population density of the grid block size is not time dependent as determined by the check of decision block 809, then the method of operation also proceeds to decision block 815.

In decision block 815 the geodescriptor determination logic 423 or the client coordination function CCF 421 checks whether the number of access points and/or base transceiver stations within the grid block are below an acceptable threshold. If yes, then the method of operation proceeds to operation block 817. In operation block 817, the geographic descriptor may be adjusted to a fourth length corresponding to a fourth resolution and a third level of abstraction. The number of access points or base transceiver stations corresponding to the grid block size may be determined by the server 200 using either the network information database 203 or the geo-tagged statistics database 201. Either of these databases may include topography information determined by crowd-sourced data for various networks such that the number of access points within a grid block size may be determined. The method of operation then proceeds to operation block 819. If the number of access points in the grid block size is not below the threshold in decision block 815, the method of operation likewise proceeds to operation block 819.

In operation block 819, the CCF 421 proceeds to collect measurement data for one or more networks and for the mobile device in some embodiments, and geotags the information using the adjusted geographic descriptor accordingly. In operation block 821 the geotagged data sent to the server 200 and the method of operation then ends.

Therefore, user anonymity is preserved using the various embodiments disclosed herein, while crowd-sourced data is collected. A server in accordance with the embodiments is operative to use the crowd-sourced data to provide intelligence back to the participating mobile devices on the best possible or most efficient way to obtain data delivery. The various embodiments enable these features and functions without any direct involvement by the networks themselves, thereby enabling mobile devices to autonomously optimize their performance with assistance as needed from a cloud based server that is not part of any particular network's infrastructure.

Figure 9:
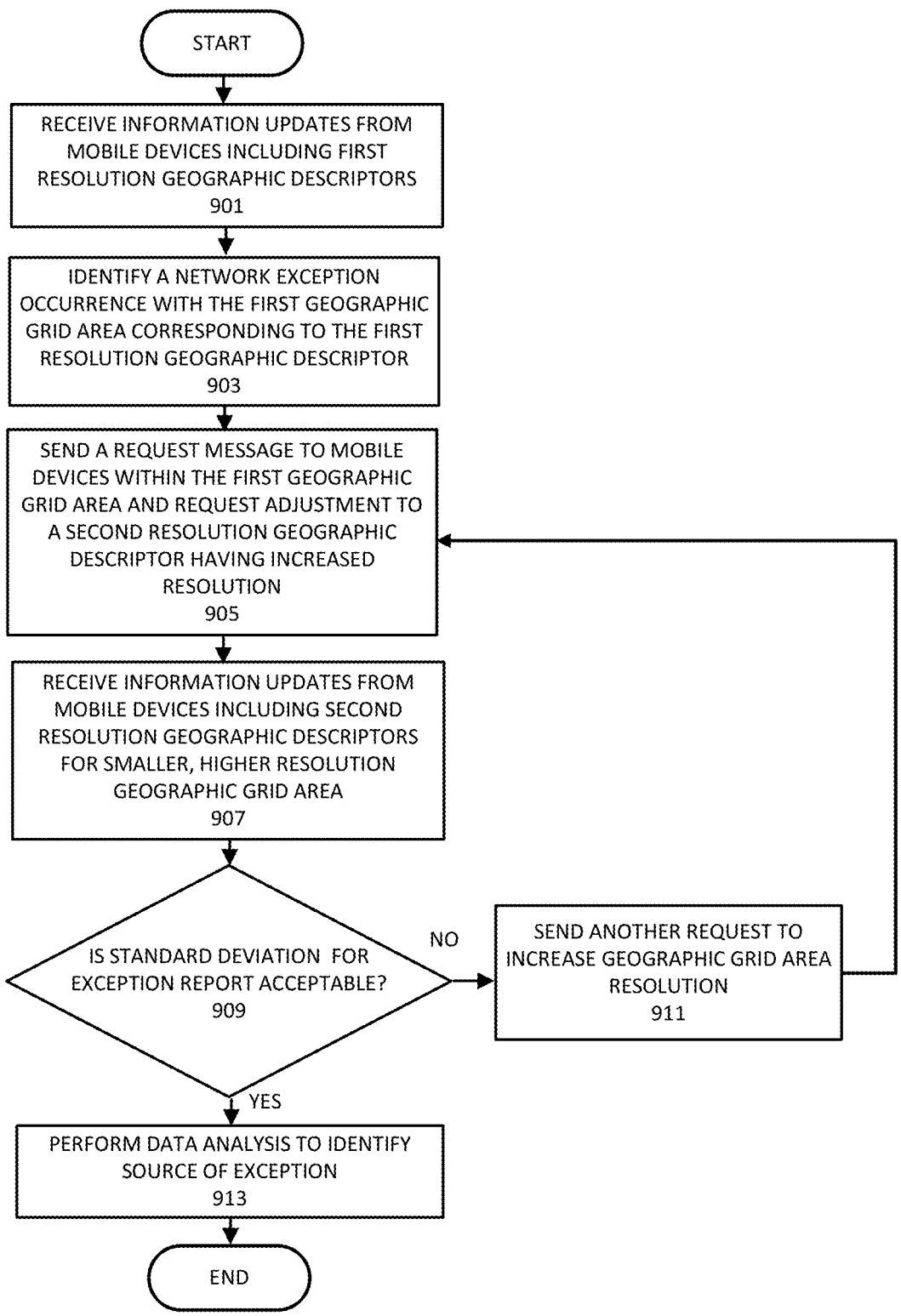
FIG. 9 is a flowchart of a method of operation of a server in accordance with an embodiment.

FIG. 9 is a flowchart providing an example method of operating a server in accordance with an embodiment. The method begins in operation block 901 with the server 200 receiving information updates 105 from a group of mobile devices that are subscribed to the server 200 services. Each information update includes a first resolution geographic descriptor that identifies a first size geographic grid area. The first size geographic grid area includes a specific location identified by mobile device location data. However the server 200 does not obtain any mobile device location data other than the first resolution geographic descriptor. The method proceeds to operation block 903 with the server 200 identifying a network exception occurrence (i.e. a network performance problem) within the first size geographic grid area based on the information updates 105. In operation block 905, the server 200 sends a request message to mobile devices within the first size geographic grid area and requests adjustment of the first resolution geographic descriptor to a second resolution geographic descriptor, by increasing the resolution to correspondingly decrease the corresponding geographic grid area to a second size geographic grid area based on the network exception occurrence. The method then proceeds to operation block 907 and the server 200 receives information updates 105 from the mobile devices within the second size geographic grid area. The information updates 105 include the measured network performance metrics and the second resolution geographic descriptor. This enables the server 200 to "zoom in" on locations having network exceptions to help identify the source of the problem and perform network troubleshooting. The server 200 aggregates the information updates 105 and generates the geotagged statistics database 201 for various heterogeneous wireless networks and therefore may identify network exceptions on any of these monitored wireless networks. Proceeding to decision block 909, the server 200 evaluates the newly received information updates 105 and determines whether a statistical criteria has been achieved for troubleshooting purposes. For example, the server 200 may check a standard deviation for the received data and when it is low enough (i.e. acceptable) it proceeds to perform data analysis in operation block 913 to attempt to identify the source of the network exception. The method of operation then ends as shown. However, if the desired standard deviation has not been obtained at decision block 909, the method of operation may proceed to operation block 911 and send another request to reporting mobile devices to increase again the geographic grid area resolution. That is, the method of operation may loop back to operation block 905 and continue to increase resolution in an attempt to zoom in on the problem area until the decision block 909 criteria is met.

It is to be understood that in FIG. 4, any of the above described components that were exemplified as software components (i.e. executable instructions or executable code executed by the processor 401) or any of the other above described components of mobile device 100 may be implemented as software or firmware (or a combination of software and firmware) executing on one or more processors, or using ASICs (application-specific-integrated-circuits), DSPs (digital signal processors), hardwired circuitry (logic circuitry), state machines, FPGAs (field programmable gate arrays) or combinations thereof.

Therefore the mobile device 100 illustrated in FIG. 4 is one example of a mobile device and is not to be construed as a limitation on the various other possible mobile device implementations that may be used in accordance with the various embodiments. For example, the client coordination function 421 and/or the geodescriptor determination logic 423 may each be a single component or may be implemented as any combination of DSPs, ASICs, FPGAs, CPUs running executable instructions, hardwired circuitry, state machines, etc., without limitation. In one example embodiment, the geodescriptor determination logic 423 may be integrated with the location detection logic 413. In another example, the client coordination function 421 and/or the geodescriptor determination logic 423 may be implemented using an ASIC that is operatively coupled to the processor 401.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
generating, by a mobile device, a first resolution geographic descriptor that identifies a first size geographic grid area comprising a specific location identified by mobile device location data;
adjusting, by the mobile device as requested by a server, the first resolution geographic descriptor to a second resolution geographic descriptor, by increasing or decreasing the resolution to correspondingly decrease or increase, respectively, the corresponding geographic grid area to a second size geographic grid area comprising the specific location;
measuring a network performance metric at the mobile device, the network performance metric including a data quality metric or a voice quality metric;
geotagging the network performance metric using the second resolution geographic descriptor; and
sending, to the server, an information update comprising the network performance metric and the second resolution geographic descriptor without providing the mobile device location data in order to perform data analysis to identify, by the server, a source of a network performance problem associated with the network performance metric.

2. The method of claim 1, further comprising:
adjusting the first resolution geographic descriptor to the second resolution geographic descriptor to meet a minimum population density of mobile devices within the second size geographic grid area.

3. The method of claim 2, further comprising:
determining the population density using historical population data.

4. The method of claim 2, further comprising:
determining that the mobile device population density within the second size geographic grid area is time dependent; and
adjusting the second resolution geographic descriptor to a third resolution geographic descriptor that identifies a third size geographic grid area comprising the specific location to meet a minimum population density of mobile devices within the third size geographic grid area.

5. The method of claim 2, further comprising:
determining that a number of radio access points within the second size geographic grid area is below a minimum allowable number; and
adjusting the second resolution geographic descriptor to a third resolution geographic descriptor that identifies a third size geographic grid area comprising the specific location to meet the minimum allowable number of radio access points within the third size geographic grid area.

6. The method of claim 1, further comprising:
receiving a request from the server to adjust the second resolution geographic descriptor to a third resolution geographic descriptor, by increasing the resolution to correspondingly decrease the corresponding geographic grid area to a third size geographic grid area based on a network exception report reporting the network performance problem; and
sending the information update comprising the performance metric and the third resolution geographic descriptor.

7. The method of claim 6, wherein sending the information update, further comprises:
sending at least one of a network ID, a cell ID, frequency and band information, or a detected radio access technology identification.

8. The method of claim 1, wherein the network performance metric comprises the data quality metric.

9. The method of claim 8, wherein the data quality metric includes or indicates a dropped call, poor data connectivity, or poor data throughput.

10. The method of claim 1, wherein the network performance metric comprises the voice quality metric, the voice quality metric including or indicating a dropped call or poor voice connectivity.

11. A mobile device, comprising:
at least one wireless network transceiver;
location detection logic;
memory; and
at least one processor, operatively coupled to the memory, to the location detection logic, and to the at least one wireless network transceiver, the at least one processor operative to:
obtain mobile device location data from the location detection logic;
generate a first resolution geographic descriptor that identifies a first size geographic grid area comprising a specific location identified by the mobile device location data;
adjust the first resolution geographic descriptor to a second resolution geographic descriptor, by increasing or decreasing the resolution to correspondingly decrease or increase, respectively, the corresponding geographic grid area to a second size geographic grid area comprising the specific location;
measure a network performance metric, the network performance metric including a data quality metric or a voice quality metric;
geotag the network performance metric using the second resolution geographic descriptor; and
send, to a server, an information update comprising the network performance metric and the second resolution geographic descriptor without providing the mobile device location data in order to perform data analysis to identify, by the server, a source of a network performance problem associated with the network performance metric.

12. The mobile device of claim 11, wherein the at least one processor is further operative to:
adjust the first resolution geographic descriptor to the second resolution geographic descriptor to meet a minimum population density of mobile devices within the second size geographic grid area.

13. The mobile device of claim 12, wherein the at least one processor is further operative to:
determine the population density using historical population data.

14. The mobile device of claim 12, wherein the at least one processor is further operative to:
determine that the mobile device population density within the second size geographic grid area is time dependent; and adjust the second resolution geographic descriptor to a third resolution geographic descriptor that identifies a third size geographic grid area comprising the specific location to meet a minimum population density of mobile devices within the third size geographic grid area.

15. The mobile device of claim 12, wherein the at least one processor is further operative to:
    determine that a number of radio access points within the second size geographic grid area is below a minimum allowable number; and
    adjust the second resolution geographic descriptor to a third resolution geographic descriptor that identifies a third size geographic grid area comprising the specific location to meet the minimum allowable number of radio access points within the third size geographic grid area.

16. The mobile device of claim 11, wherein the at least one processor is further operative to:
    receive a request from the server to adjust the second resolution geographic descriptor to a third resolution geographic descriptor, by increasing the resolution to correspondingly decrease the corresponding geographic grid area to a third size geographic grid area based on a network exception report reporting the network performance problem; and
    send the information update to the server comprising the performance metric and the third resolution geographic descriptor.

17. The mobile device of claim 16, wherein the at least one processor is further operative to send the information update to the server, comprising at least one of a network ID, a cell ID, frequency and band information, or a detected radio access technology identification.

18. The mobile device of claim 11, wherein the network performance metric comprises the data quality metric.

19. The mobile device of claim 18, wherein the data quality metric includes or indicates a dropped call, poor data connectivity, or poor data throughput.

20. The mobile device of claim 11, wherein the network performance metric comprises the voice quality metric, the voice quality metric including or indicating a dropped call or poor voice connectivity.

* * * * *